United States Patent [19]

Philleo

[11] 4,214,458
[45] Jul. 29, 1980

[54] FLEXIBLE COUPLING AND METHOD OF MAKING SAME

[75] Inventor: Robert C. Philleo, Centerville, Ohio

[73] Assignee: Dayco Corporation, Dayton, Ohio

[21] Appl. No.: 968,540

[22] Filed: Dec. 11, 1978

[51] Int. Cl.³ .................................................. F16D 3/64
[52] U.S. Cl. ................................... 64/11 R; 64/27 NM
[58] Field of Search .............. 64/11 R, 15 R, 15 B, 64/27 NM

[56] References Cited

U.S. PATENT DOCUMENTS

| | | | |
|---|---|---|---|
| 1,194,662 | 8/1916 | Rathbun | 64/15 B |
| 1,225,518 | 5/1917 | Smith | 64/15 B |
| 2,172,707 | 9/1939 | Julien | 64/11 R |
| 2,409,385 | 10/1946 | Pletcher | 64/11 R |
| 2,696,719 | 12/1954 | Sklar | 64/15 B |
| 2,857,749 | 10/1958 | Fabbri | 64/11 R |
| 2,860,495 | 11/1958 | Stark | 64/15 B |
| 2,872,225 | 2/1959 | Walker | 64/11 R |
| 2,884,240 | 4/1959 | Loughlin | 64/15 B |
| 3,136,142 | 6/1964 | Zeidler | 64/15 B |
| 4,092,837 | 6/1978 | Gebauer | 64/27 NM |

Primary Examiner—Ira S. Lazarus
Attorney, Agent, or Firm—Reuben Wolk; Charles E. Bricker

[57] ABSTRACT

A flexible coupling and method of making same are provided wherein such coupling is particularly adapted to transmit rotary power and has opposed end structures and flexible coupling members disposed between the end structures with such coupling members consisting solely of a plurality of rectilinear members having opposite end portions thereof supported by the end structures and the coupling members are defined primarily of polymeric material.

14 Claims, 4 Drawing Figures

FLEXIBLE COUPLING AND METHOD OF MAKING SAME

BACKGROUND OF THE INVENTION

1. Field of the Invention

This invention relates to a flexible coupling for transmitting rotary power and method of making same.

2. Prior Art Statement

It is known in the art to provide a flexible coupling for transmitting rotary power and comprising opposed end structures which are interconnected by flexible coupling members and such a coupling is illustrated in U.S. Pat. No. 3,924,082, for example. However, the coupling members taught in this patent are generally of complex design and thus comparatively expensive to manufacture and assemble resulting in increasing the overall cost of the coupling and the cost of maintenance of such coupling during operation.

SUMMARY

It is a feature of this invention to provide a flexible coupling for transmitting rotary motion and power which is of a simple and economical construction.

Another feature of this invention is to provide a coupling of the character mentioned comprised of opposed end structures and flexible coupling members disposed between the end structures wherein such coupling members consist solely of a plurality of rectilinear members having opposite end portions thereof supported by the end structures and with the coupling members being defined primarily of a yieldable yet resilient polymeric material.

Another feature of this invention is to provide a coupling of the character mentioned wherein the rectilinear members are substantially identical and comprise predetermined lengths of power transmission belts of known standard design.

Another feature of this invention is to provide a coupling of the character mentioned wherein the rectilinear members are substantially identical and comprise predetermined lengths of polymeric power transmission belts of any desired cross-sectional configuration, the predetermined lengths permitting the opposed end structures to be placed at variable distances from each other.

Another feature of this invention is to provide a coupling of the character mentioned employing predetermined lengths of endless power transmission belts of trapezoidal cross-sectional configuration.

Another feature of this invention is to provide a coupling of the character mentioned capable of employing predetermined lengths of power transmission belts for its coupling members which may be cut from new scrapped belts, new usable belts, or used discarded belts whereby the coupling has a ready supply of belt material to define its coupling members.

Another feature of this invention is to provide an improved flexible coupling of the character mentioned wherein such coupling comprises simple means enabling the removal and reinstallation of coupling members while maintaining end structures of the coupling in position between a pair of shafts which are rotary coupled.

Another feature of this invention is to provide an improved method of making a flexible coupling of the character mentioned.

Therefore, it is an object of this invention to provide an improved flexible coupling and method of making the same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
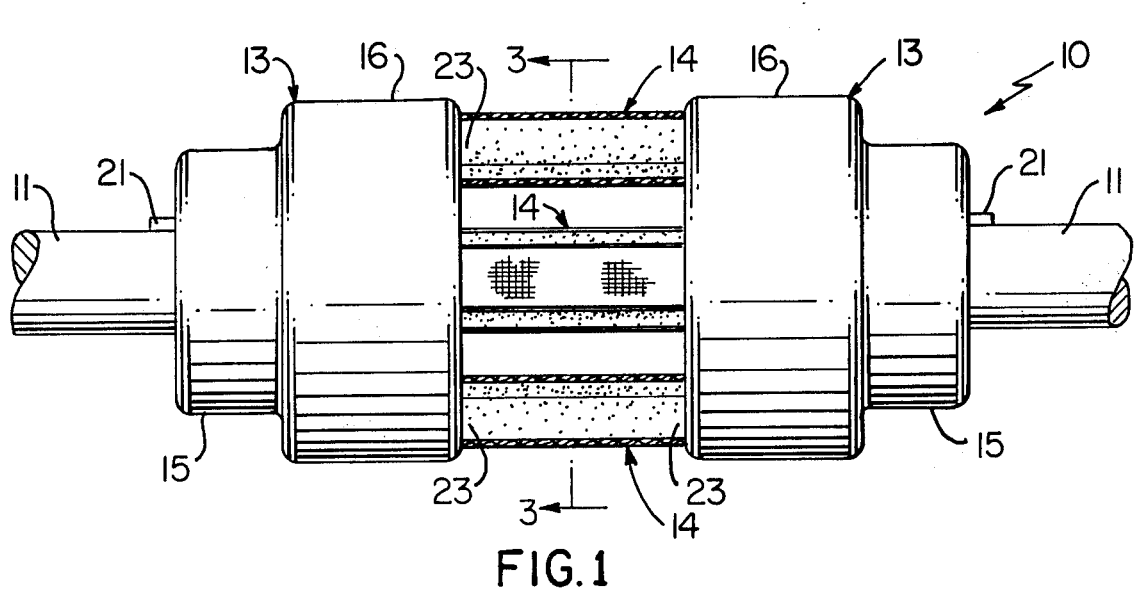
FIG. 1 is a view in elevation with parts broken away of one exemplary embodiment of a flexible coupling of this invention and comprising a pair of end structures with flexible coupling members disposed between the end structures.

Reference is now made to the FIG. 1 of the drawing which illustrates one exemplary embodiment of a flexible coupling of this invention which is designated generally by the reference numeral 10. The flexible coupling 10 is particularly adapted for transmitting rotary motion and power between a pair of shafts each designated by the same reference numeral 11; and, the shafts 11 may be of the type which normally rotate at comparatively fixed axial positions and are coupled by a flexible coupling such as coupling 10.

The coupling 10 comprises a pair of end structures each designated by the same reference numeral 13 and flexible coupling members shown in this example as a plurality of rectilinear coupling members each designated by the same reference numeral 14. The coupling members 14 are disposed between the end structures 13 and suitably operatively associated therewith preferably by attachment thereto as will be described in detail subsequently.

Each of the end structures 13 comprises a hub-like portion 15 and a radially outwardly extending outer portion 16. In this example the hub-like portion 15 and outer portion 16 are defined as a single-piece structure.

Figure 2:
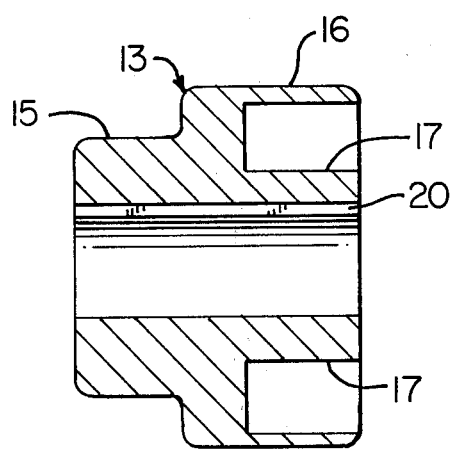
FIG. 2 is a cross-sectional view particularly illustrating a typical one of the substntially identical end structures of the coupling of FIG. 1 minus its coupling members and adjoining components.

Each end structure 13 has a plurality of holes in its outer portion 16 for receiving associated end portions of members 14 therewithin and for simplicity of presentation each of such holes is designated by the same reference numeral 17. Each end structure 13 also has a keyway 20 therein as shown in the typical end structure 13 in FIGS. 2 and 3. The keyway 20 is particularly adapted to receive a key 21 which is also simultaneously received in a cooperating keyway 22 in an associated shaft 11 to thereby mechanically interconnect each shaft 11 with its end structure 13 and allow the transmission of rotary motion between shaft 11 and its end structure 13.

Each flexible coupling member 14 has an end portion 23 disposed within an associated hole 17 and each end portion 23 may be suitably fixed in position employing adhesive means or suitable mechanical means, as desired. Further, each end portion 23 may be simply disposed in its associated hole 17 and retained in an axially confined direction by its associated end structure free of any fixing or attaching means between end structure 13 and end portion 23 whereby the members 14 are held in position simply by confining their end portions 23 within end structures 13.

Each member 14 may be made of any suitable material employed in the art for this purpose; however, in accordance with this invention each member is preferably in the form of a cut length of a power transmission belt, whether in the form of a new scraped belt, a new usable belt, or a used belt which is worn or locally damaged to the point of not being usable as a power transmission belt. The members 14 are rectilinear members which are disposed between the end structures 13 and comprise the only or sole interconnection between such end structures. Further, in order to provide the desired flexibility for the rotary coupling 10 as well as prevent the transmission of severe shock loads during rotary movements each member 14 is made primarily of polymeric material which has the desired elastic characteristics yet has the required resiliency to enable functioning thereof as a coupling member.

As indicated earlier, the members 14 are preferably substantially identical members and each member is made from a predetermined identical length of the same type of endless power transmission belt. As will be readily apparent from FIG. 3 of the drawing each power transmission belt member 14 is of a trapezoidal cross-sectional configuration and is comprised of the usual belt tension section 24, compression section 25, and load-carrying section in the form of a helically wound cord 26. In this example, each trapezoidal belt length 14 has a cover 30 on its tension section, and a cover 31 on its compression section.

Figure 3:
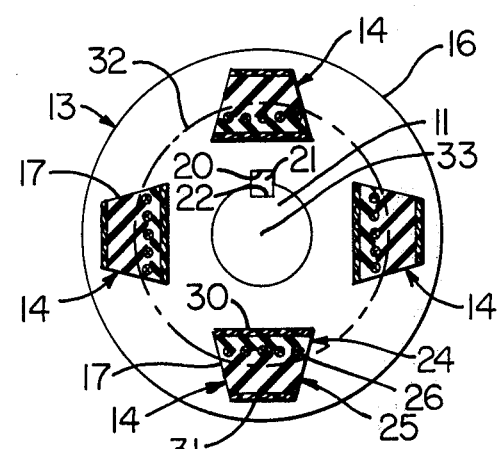
FIG. 3 is a cross-sectional view taken essentially on the line 3—3 of FIG. 1.

The flexible coupling members 14 are disposed with their central longitudinal axes in a cylindrical pattern shown by dot-dash lines 32 in FIG. 3; and, the cylindrical pattern 32 has a central axis common with the central axis of rotation 33 of the coupling 10. Each coupling member 14 of trapezoidal cross section has a wide parallel side and a narrow parallel side and the belt lengths or elements 14 are disposed with their wide parallel sides closely adjacent the axis 33 whereby the narrow parallel sides thereof are disposed remote from such axis.

The flexible coupling members 14 are disposed with their central axes in the previously mentioned cylindrical pattern 32 and preferably with equal angular displacement therebetween. In this example of the invention the members 14 are disposed with their central longitudinal axes 90° apart.

Figure 4:
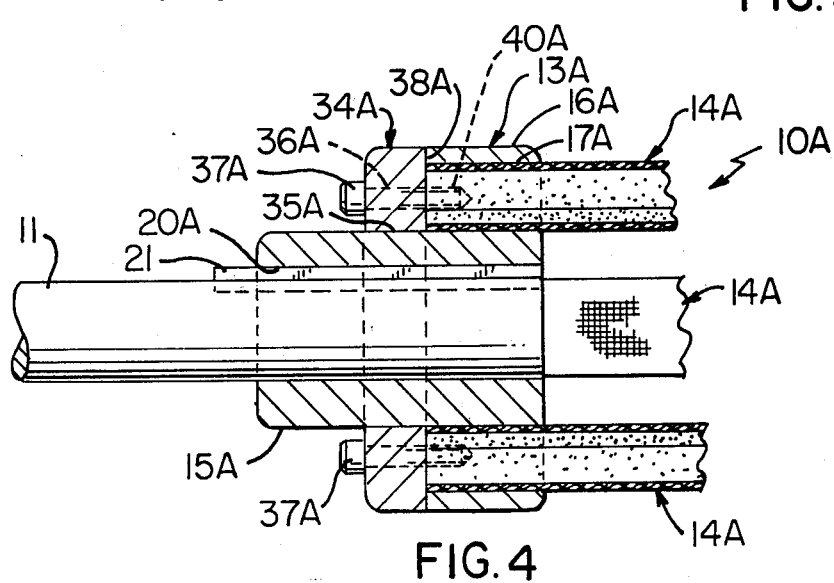
FIG. 4 is a cross-sectional view with parts in cross-section, parts in elevation, and parts broken away illustrating roughly half of another exemplary embodiment of a flexible coupling of this invention.

Another exemplary embodiment of the coupling of this invention is illustrated in FIG. 4 of the drawing. The coupling of FIG. 4 is very similar to the coupling 10; therefore, such coupling will be designated by the reference numeral 10A and representative parts of such coupling which are similar to corresponding parts of the coupling 10 will be designated in the drawing by the same reference numerals as in the coupling 10 followed by the letter A and not described in detail.

The main difference between the coupling 10A and the coupling 10 is in each identical end structure 13A as will be subsequently described, and a typical end structure is illustrated in FIG. 4. Each end structure 13A also has a hub portion 15A provided with a keyway 20A which cooperates with an associated keyway of a shaft 11 and receives a key 21 to connect same to the associated shaft 11. Each end structure 13A also has an outer portion 16A provided with a plurality of holes 17A therein for receiving belt lengths 14A in the form of predetermined lengths of endless power transmission belts 14A. However, each end structure 13A differs from end structure 13 in that each has an annular plate 34A detachably fastened thereto as illustrated in FIG. 4. Each plate 34A has an inside surface 38A which defines the bottoms of the holes 17A associated therewith and each plate 34A when fastened in position defines each hole 17A as a blind hole.

Each plate 34A is disposed concentrically around the outside cylindrical surface 35A of its hub-like portion 15A and each plate 34A has a plurality of openings 36A therein which are particularly adapted to receive metal screws 37A therethrough which are threadedly fastened within associated threaded openings 40A in the outer portion 16A of the associated end structure 13A. Once the annular plates 34A of coupling 10A are fastened in position by screws 37A the flexible coupling members 14A are confined against axial movement by such plates 34A. However, it will be appreciated that in the event that elements 14A require replacement due to heavy wear or damage thereto it is a simple matter to unfasten the threaded screws 37A and move the associated annular plate 34A axially along its associated shaft 11 thereby exposing the associated ends of the members 14A. With the plate 34A in an end structure 13A removed the associated holes 17A are open at both ends. The members 14A may be simply removed by sliding same out of the open-end holes toward the removed plate 34A which has been axially slid away from the coupling 10A along its associated shaft. Replacement elements 14A may then be installed in position by reversing this removal procedure and once the removed plate 34A is reinstalled employing the threaded screws 37A the coupling 10A is again ready for use.

In this latter example of the invention the coupling 10A has been described as having a pair of end structures 13A defining its opposite end structures; however, it is to be understood that an end structure 13A need only comprise one end of the coupling with the opposite end consisting of end structure 13 or other suitable similar structure.

The members 14A are easily replaced by removal of an end plate 34A as described above; however, the members 14 of the coupling 10 may also be easily replaced by removing the key 21 at one end thereof and then axially moving the associated end structure 13 along its shaft 11 and away from the old worn members 14 to thereby facilitate removal of the old worn members 14 and installation of new members 14.

As previously indicated the coupling members 14 are preferably made using belt lengths of trapezoidal cross-section; however, it is to be understood that the belt lengths may be of any desired cross-section employed in power transmission belts. Further, the belt lengths may be made or cut using endless power transmission belts or belts of the non-endless variety which require belt coupling devices to complete same and define endless power transmission belts.

The basic concept of this invention is the use of simple substantially identical rectilinear members which have their opposite end portions fastened between a pair of spaced end structures and this enables the provision of a simple coupling for transmitting rotary motion or power wherein end structures 13 may be placed variable distances from each other. In addition, the end structures and hence a pair of spaced shafts 11—11 need not necessarily be in precise rectilinear alignment in order to still provide a satisfactory coupling and this is due to the use of simple coupling members such as 14 and 14A, for example.

As stated earlier any power transmission belt employed in the art which is preferably made primarily of polymeric material may be utilized to define the coupling members 14 or 14A regardless of belt type. However, it is preferred that the cross-sectional configuration of each hole in an end structure conform with the belt cross-section.

It is also apparent that the utilization of belt lengths of trapezoidal cross-section is particularly advantageous in that placing the wider of the parallel sides more closely adjacent the central axis of rotation of the coupling reduces the moment of inertia and centrifugal force exerted on the coupling members of the coupling.

In this disclosure of the invention the belt lengths defining the coupling members 14 and 14A are shown with covering material on the parallel sides thereof; however, it will be appreciated that the belt lengths may each be completely wrapped with covering material about its entire periphery. Similarly, the belt lengths may be in the form of so-called raw-edged belt lengths with each being free of covers about its entire outer periphery.

While present exemplary embodiments of this invention, and methods of practicing the same, have been illustrated and described, it will be recognized that this invention may be otherwise variously embodied and practiced within the scope of the following claims.

What is claimed is:

1. In a flexible coupling for transmitting rotary power comprising opposed end structures and flexible coupling members disposed between said end structures the improvement wherein said coupling members consist solely of a plurality of rectilinear members having opposite end positions thereof supported by said end structures, said rectilinear members being defined primarily of polymeric material, said rectilinear members being substantially identical and comprising predetermined belt lengths of power transmission belt structure, and each of said belt lengths having a uniform cross-sectional configuration throughout its length.

2. A coupling as set forth in claim 1 in which each of said belt lengths is of trapezoidal cross-sectional configuration.

3. A coupling as set forth in claim 2 in which said belt lengths are disposed with their central longitudinal axes in a cylindrical pattern which has a center common with a central axis of rotation of said coupling, each of said trapezoidal belt lengths having a wide parallel side and a narrow parallel side, said belt lengths being disposed with their wide parallel sides closer to said axis than their narrow parallel sides.

4. A coupling as set forth in claim 3 in which said belt lengths are disposed in said cylindrical pattern with equal angular displacement therebetween.

5. A coupling as set forth in claim 4 in which each of said end structures has a plurality of holes therein which receive said end portions of said belt lengths, each of said holes being a blind hole defined by confining walls with only one opening therein defining an open end, and each of said holes having a cross-sectional configuration at each axial position therealong which conforms with the cross-sectional configuration of the associated end portion of a rectilinear member received therewithin.

6. A coupling as set forth in claim 4 in which each of said end structures has a plurality of holes therein which receive said end portions of said belt lengths, each of said holes being a blind hole defined by confining walls with only one opening therein defining an open end, each of said holes having a cross-sectional configuration at each axial position therealong which conforms with the cross-sectional configuration at the associated end portion of a rectilinear member received therewithin, and further comprising, an annular plate detachably fastened to each of said end structures, each of said plates in its fastened position defining the bottom of said holes in said end structure associated therewith, and each plate in its unfastened position allowing access to said holes for replacement of said belt lengths.

7. A coupling as set forth in claim 6 and further comprising a plurality of threaded fastening screws for threadedly and detachably fastening each of said plates in position.

8. A coupling as set forth in claim 1 and further comprising means fastening each of said belt lengths in position in their aassociated end structures.

9. A coupling as set forth in claim 1 in which each of said end structures comprises a hub-like portion and a keyway in each hub-like portion for receiving a key therein which operatively associates with an associated shaft which is to be coupled with a particular end structure.

10. In a flexible coupling for transmitting rotary power comprising opposed end structures and flexible coupling members disposed between said end structures the improvement wherein said coupling members consist solely of a plurality of rectilinear members having opposite end portions thereof supported by said end structures, said rectilinear members being defined primarily of polymeric material, each of said end structures having a plurality of holes therein which receive associated end portions of said rectilinear members, each of said holes being a blind hole defined by confining walls with only one opening therein defining an open end, and each of said holes having a cross-sectional configuration at each axial position therealong which conforms with the cross-sectional configuration of the associated end portion of a rectilinear member received therewithin.

11. A coupling as set forth in claim 10 and further comprising an annular plate detachably fastened to each of said end structures, each of said plates in its fastened position defining the bottom of the holes in the end structure associated therewith, and each plate in its unfastened position allowing access to said holes for replacement of said rectilinear members.

12. A coupling as set forth in claim 10 in which each of said end portions of each rectilinear member is disposed in its associated blind hole free of attaching means between the end portion and surface means defining the associated blind hole.

13. A coupling as set forth in claim 10 and further comprising means fixing each end portion of each rectilinear member to surface means defining its associated blind hole.

14. A coupling as set forth in claim 13 in which said fixing means comprises adhesive means.

* * * * *